(12) United States Patent
Simonis

(10) Patent No.: US 6,216,844 B1
(45) Date of Patent: Apr. 17, 2001

(54) MOUNTING SYSTEM FOR ASSEMBLING COMPONENTS

(75) Inventor: Gerhard Simonis, Bremen (DE)

(73) Assignee: ABB Patent GmbH, Mannheim (DE)

( * ) Notice: Subject to any disclaimer, the term of this patent is extended or adjusted under 35 U.S.C. 154(b) by 0 days.

(21) Appl. No.: 09/149,813

(22) Filed: May 30, 2000

(Under 37 CFR 1.47)

(30) Foreign Application Priority Data

Sep. 6, 1997 (DE) .............................. 197 39 149
Oct. 10, 1997 (DE) .............................. 197 44 909

(51) Int. Cl.[7] ........................................ B65G 37/00
(52) U.S. Cl. ........................ 198/346.1; 198/867.08; 198/867.11
(58) Field of Search ................... 198/346.1, 867.08, 198/867.11, 867.13

(56) References Cited

U.S. PATENT DOCUMENTS

| | | | |
|---|---|---|---|
| 4,489,821 | * 12/1984 | Inaba et al. | 198/346.1 |
| 4,492,301 | * 1/1985 | Inaba et al. | 198/346.1 |
| 4,706,796 | * 11/1987 | Chambers | 198/346.1 |
| 4,898,269 | * 2/1990 | Hannig | 198/346.1 |

* cited by examiner

Primary Examiner—Joseph E. Valenza
(74) Attorney, Agent, or Firm—Herbert L. Lerner; Laurence A. Greenberg; Werner H. Stemer

(57) ABSTRACT

A mounting system includes a conveyor system and a workpiece carrier. The workpiece carrier has a base plate resting on the conveyor system, at least one column extending vertically away from the base plate, and a supporting element separably connected to the column for receiving components. The mounting system also includes a plurality of mounting stations for receiving the components transported on the workpiece carrier. Each of the plurality of mounting stations has a frame, a long stroke unit disposed laterally of the conveyor system and secured to the frame, and a supporting bracket projecting in a cantilevered fashion from the long stroke unit for engaging from beneath the supporting element of the workpiece carrier. The long stroke unit with the supporting bracket raises the components in a lift-like fashion and brings the components in position to a respective mounting station.

9 Claims, 6 Drawing Sheets

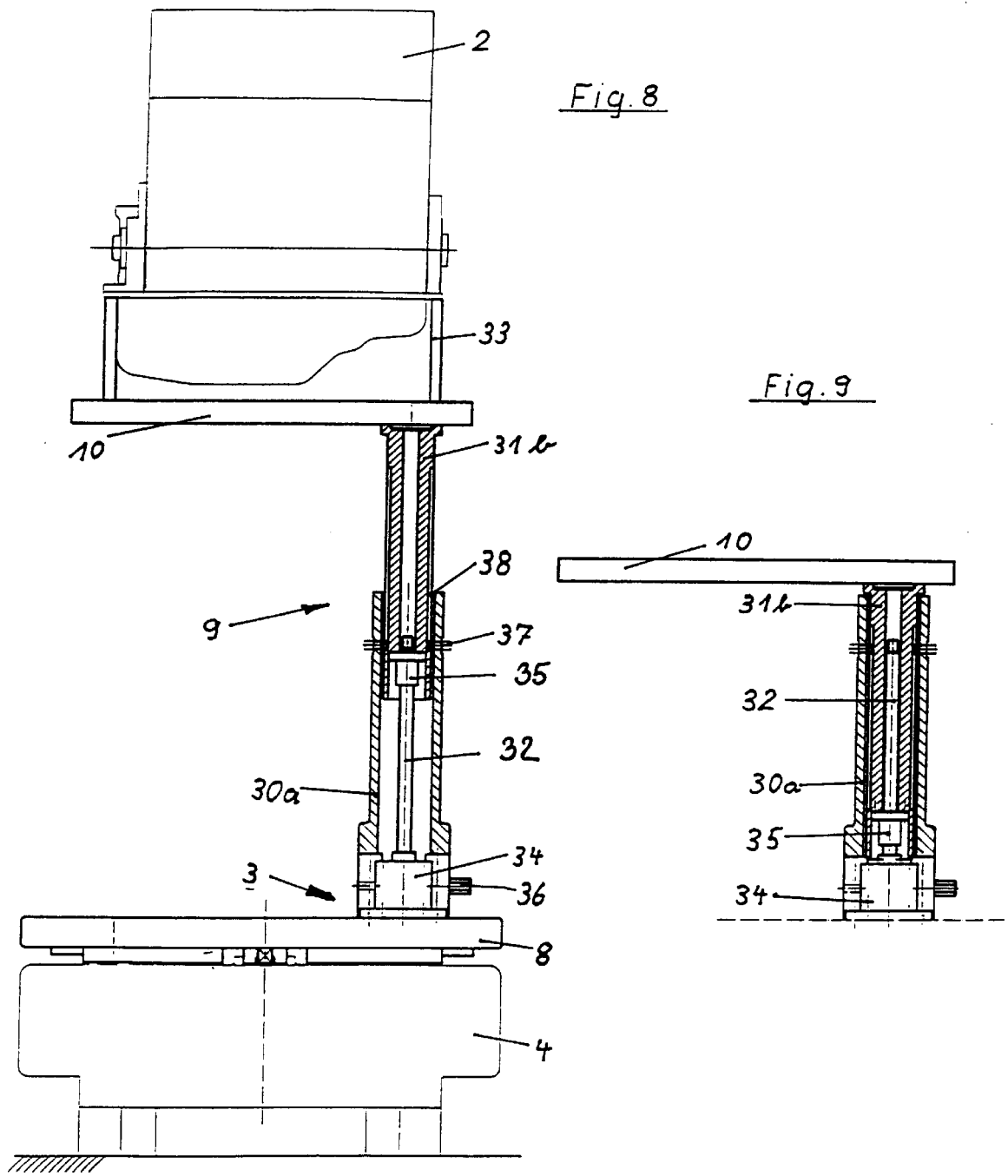

MOUNTING SYSTEM FOR ASSEMBLING COMPONENTS

BACKGROUND OF THE INVENTION

Field of the Invention

The invention relates to a mounting system for assembling components which are brought to mounting stations on a workpiece carrier of a conveyor system. Each mounting station has a frame, and wherein a long stroke unit raises components in lift-like fashion and brings them in position to the selected mounting station.

In such known mounting systems for performing mounting, testing or machining operations on components, the workpiece carriers, disposed on the conveyor belt of the conveyor system that is responsible for conveying in the horizontal direction are raised, together with the components resting on them, in lift-like fashion to the work position of the mounting station with the aid of the long stroke unit. Raising the workpiece carrier has the advantage that the mounting apparatus, such as screwing units, need not be moved.

Since the workpiece carrier is also raised, the long stroke unit is disposed between two longitudinally extending conveyor belt profiles of the conveyor system and as a rule is secured to a cross strut of the frame of the mounting station. As a consequence, an undesirably large free space must be provided between the floor and the conveyor system, to allow for the elements of the long stroke unit. Another disadvantage is considered to be that the elements of the long stroke unit are disposed on a cross strut of the frame, and consequently the frame, long stroke unit and conveyor belt form a unit. The mounting of these three component groups can therefore be done only jointly, and for delivery to the usage site, they must be disconnected again, so that complicated and expensive re-erection must be done on site.

An apparatus is known that has a workpiece carrier movable along a production line from Published, Non-Prosecuted German Patent Application DE 40 15 702 A1. However, that reference provides no long stroke device for lift-like raising of components.

For transferring workpiece carriers to conveyor systems of different height, transfer stations are known from German Patent DE 19 500 148 C1.

German Examined, Published Patent Application 1 288 505 shows a workpiece carrier that can be raised in its entirety together with the workpiece.

SUMMARY OF THE INVENTION

It is accordingly an object of the invention to provide a mounting system for assembling components which overcomes the hereinafore-mentioned disadvantages of the heretofore-known devices of this general type, which has a reduced structural height of the conveyor system and a simplified construction of the mounting system.

With the foregoing and other objects in view there is provided, in accordance with the invention, a mounting system, including: a conveyor system; a workpiece carrier having a base plate resting on the conveyor system, at least one column extending vertically away from the base plate, and a supporting element releasably connected to the at least one column for receiving components; and a plurality of mounting stations for receiving the components transported on the workpiece carrier, each of the plurality of mounting stations including: a frame; a long stroke unit disposed laterally of the conveyor system and secured to the frame; and a supporting bracket projecting in a cantilevered fashion from the long stroke unit for engaging from beneath the supporting element of the workpiece carrier, the long stroke unit with the support bracket raising the components in a lift-like fashion and bringing the components in position to a respective mounting station.

Because of the columnar construction of the workpiece carrier, the workpiece carrier remains with its base plate and columns on the conveyor belt, while the supporting bracket of the long stroke unit needs only to raise the supporting element, receiving the components, into position to the mounting station. There is thus no longer any need to engage the entire workpiece carrier from beneath, which can be done only from a free space between the conveyor belt profiles. Along with the long stroke unit that is now disposed laterally of the conveyor belt, the conveyor system have a substantially lower structure, which makes it possible to cross over the conveyor system and leads to a generally more open mounting system. The long stroke unit can now be installed independently of the conveyor system.

To allow collision-free movement of the columns of the workpiece carrier past the supporting bracket of the stationary long stroke unit when the conveyor system with the workpiece carrier is moving longitudinally, the supporting bracket is embodied so that it can be pivoted out of the way or retracted.

If the supporting bracket has a rigid construction, the column is disposed on the symmetrical half of the base plate remote from the long stroke unit, to assure that the workpiece carriers can move past without colliding.

In accordance with an added feature of the invention, the at least one column and the supporting element are configured to form a separable plug-type connection.

The supporting bracket for raising the supporting element is preferably embodied in the form of two parallel-extending forks.

Particularly in the case of closed frames that surround the conveyor belt on all sides (so-called O-frames), there is provided, for the sake of independent mounting of the conveyor system on the one hand and the frame with the long stroke unit on the other, that once the conveyor system has been constructed, the lower cross strut is separated from the frame, thrust under the conveyor system, and screwed to the conveyor system. Next, the remaining frame is fitted over the conveyor belt and after locking is screwed to the cross strut. If a plurality of elements, such as the long stroke device, a machining device, a control cabinet and sensor equipment are pre-mounted to the frame, then the mounting system can for instance be put into operation independently of the conveyor system.

In accordance with an additional feature of the invention, the frame has a cross strut formed with a recess therein and a sub-frame with a centering pin, the conveyor system has a conveyor belt profile and a tab, the cross strut is separated from the frame and joined to the conveyor belt profile via the tab, the centering pin is then locked into the recess of the cross strut, and the sub-frame is screwed to the cross strut.

To allow adaptation of the height of workpieces with a conveyor system of constant height, there is provided that the base plate is assigned a lower column portion and at least two upper column portions of different lengths projecting in cantilevered fashion from the supporting element. The lower column portion is selectively connected to one of the upper column portions.

By horizontally offsetting the supporting element with the aid of the long stroke unit or some other hoisting tool, one of the upper column parts is set down on the lower column part. Without using moving parts that are vulnerable to malfunction, such as a transfer device, the workpiece height is changed while keeping the conveyor system height unchanged.

To enable assuming a predetermined position in the transfer of the upper column parts, positioning elements are associated with the upper and/or the lower column part.

Preferably, the positioning elements are pins, associated with the upper and/or lower column part, which can be inserted into bores of the lower and/or upper column part.

In another embodiment it is provided that the column includes an upper column part, connected to the supporting element, and a lower column part, connected to the base plate. The upper column part is axially displaceable together with the supporting element relative to the lower column part and can be locked in the applicable position.

Due to the relative displaceability in the axial direction of the upper and lower parts of the column, the length of the column and thus the height of the workpiece are changed.

By using a spacer between the upper and lower column parts, many different height settings are possible.

If a spindle is integrated into the upper and/or lower column part, then a continuous adjustment of the height is possible, which can be done via a manual crank or an electric motor.

In accordance with a concomitant feature of the invention, the supporting bracket is retractably connected to the long stroke unit for retracting a predetermined extent.

Other features which are considered as characteristic for the invention are set forth in the appended claims.

Although the invention is illustrated and described herein as embodied in a mounting system for assembling components, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 8 is a partly broken away, partly sectional, front elevation view of a spindle drive integrated with a column; and FIG. 9 is a partially sectional, front elevational view of the reduced working height of the workpiece carrier.

DESCRIPTION OF THE PREFERRED EMBODIMENTS

Figure 1:
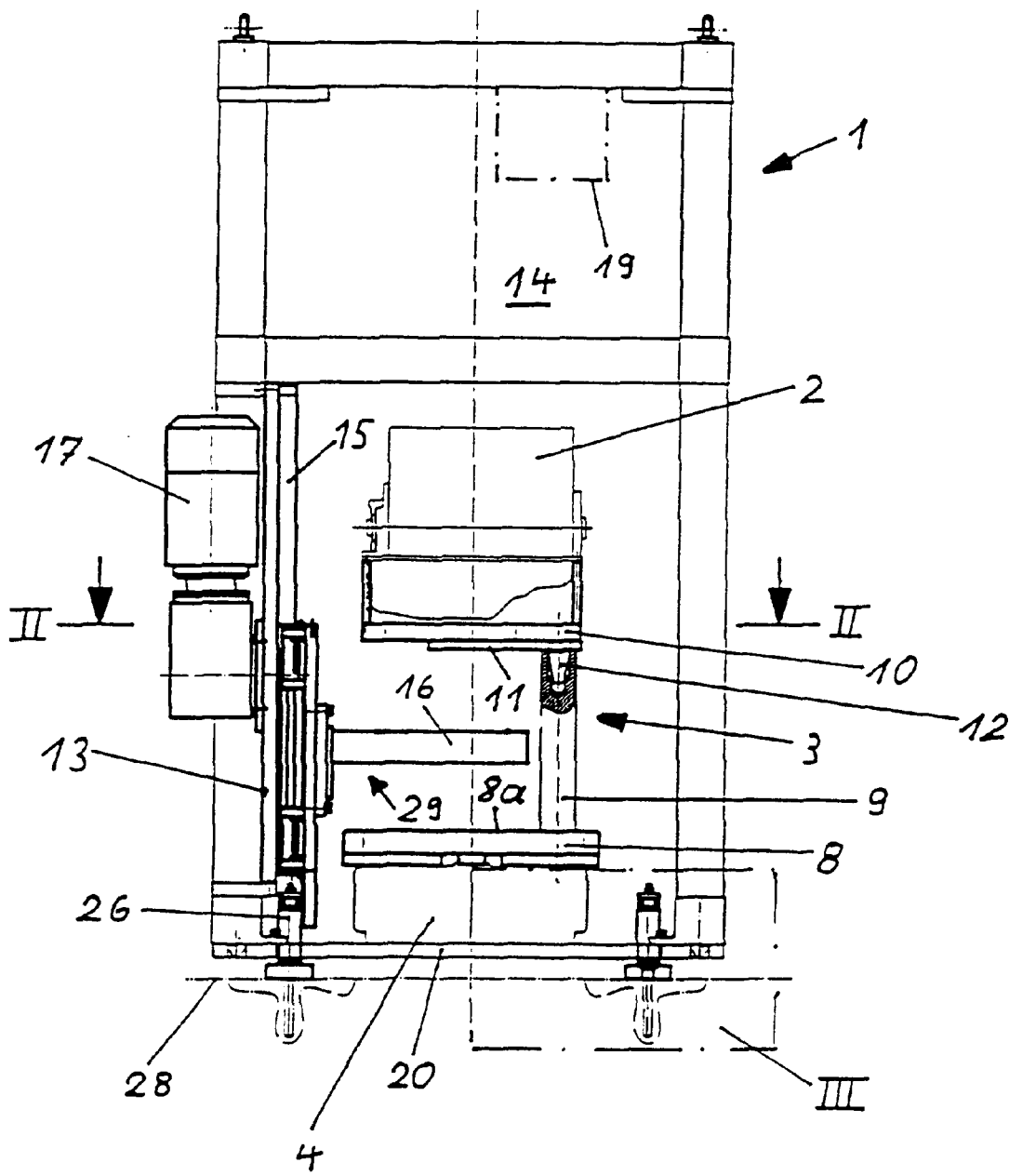
FIG. 1 is a partly broken away, partly sectional, front elevational view of a conveyor system with a frame, a workpiece carrier, and a long stroke device.
Figure 2:
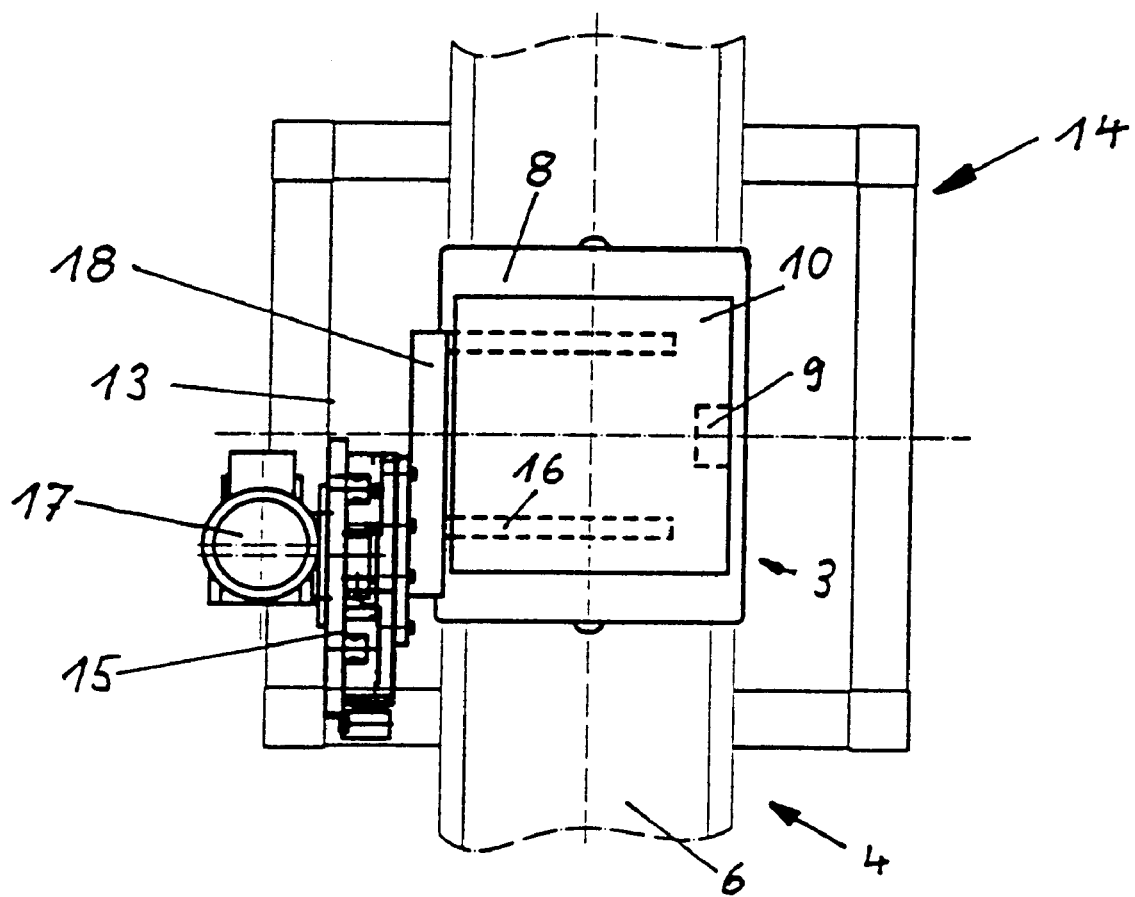
FIG. 2 is a fragmentary, cross-sectional view taken along the line II—II of FIG. 1.
Figure 3:
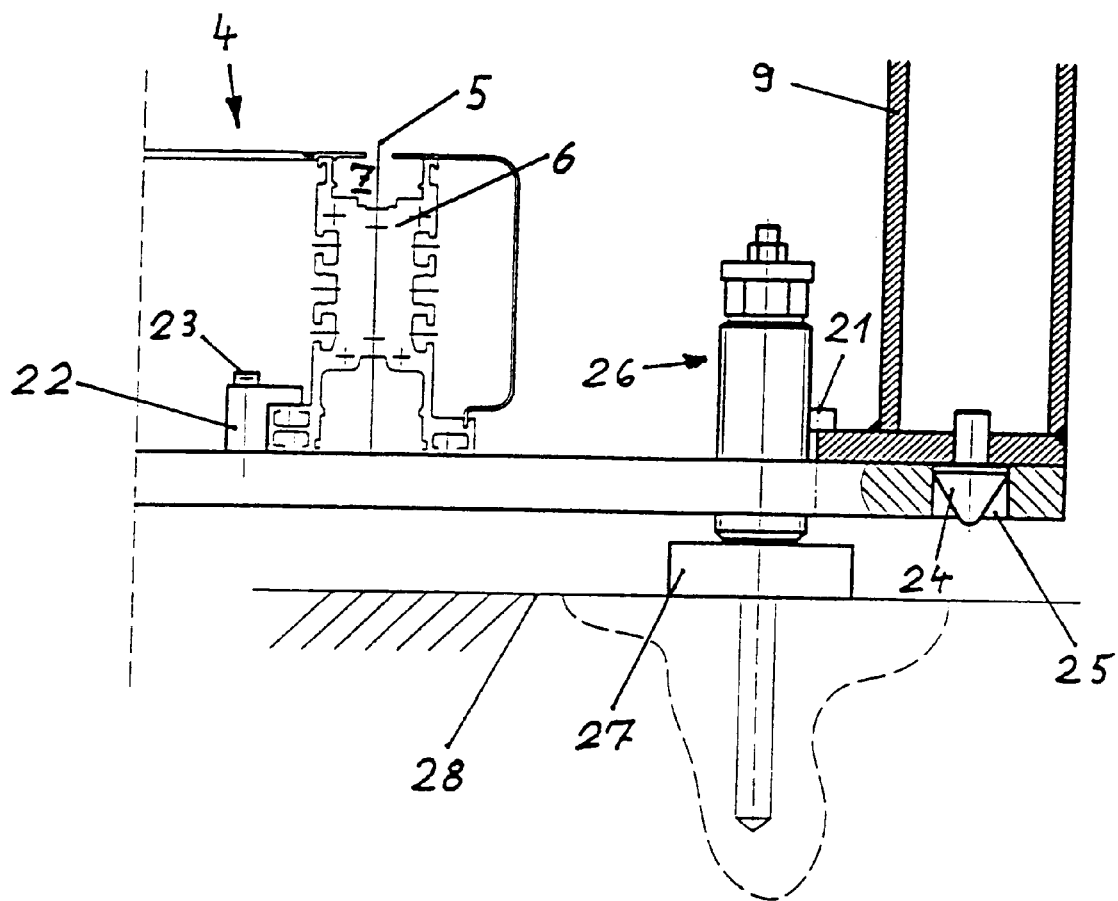
FIG. 3 is an enlarged, partly sectional view of detail III shown in FIG. 1.

Referring now to the figures of the drawing in detail and first, particularly, to FIG. 1 thereof, there is shown a portion of a mounting system 1 for components 2, such as motors or gears, that are disposed on a workpiece carrier 3 and are movable along a conveyor system 4. As can be better seen from FIG. 3, the conveyor system 4 includes a conveyor belt 5, which includes two parallel-extending conveyor belt profiles 6. The free spaces 7 of the conveyor belt can for instance receive a non-illustrated accumulating roller chain on which the workpiece carrier 3 rests. The workpiece carrier 3 includes a base plate 8, braced on the conveyor belt 5; a laterally offset column 9, which is disposed on a right symmetrical half 8a of the base plate 8; and a supporting element 10 for receiving the component(s) 2. The supporting element 10, which may be a plate reinforced with a bracket 11, has a pin 12, which engages a corresponding recess of the column 9 and acts as a plug-type connection. Disposed between the conveyor system 4 and a side wall 13 of a frame 14 is a so-called long stroke unit 15, which is secured to the side wall 13 of the frame 14. The long stroke unit 15 has a supporting bracket 29, which includes two parallel-extending forks 16 (FIG. 2). The forks 16 are cantilevered so far out from of the long stroke unit 15 that a predeterminable spacing from the column 9 still remains to permit collision-free displacement motion of the workpiece carrier relative to the forks 16. The long stroke unit 15 has a drive motor 17, which can move a carriage 18, which carries the forks 16, by a predeterminable amount in the vertical direction. The forks 16 engage the supporting element 10 from beneath and as they move farther upward undo the plug-type connection of the pin 12 and raises the supporting element 10, together with the component 2, up into a working range of a mounting tool indicated by reference numeral 19. The mounting tool 19 is connected to the frame 14. Together with other testing and machining devices that may also be provided, they form a mounting station.

The frame 14 shown in FIG. 1 is a so-called O-frame, because it surrounds the conveyor system 4 on all sides. How such a frame can be constructed, in order to incorporate a mounting station, after the complete mounting of the conveyor system 4, into the mounting system 1 in a simple way will now be explained in conjunction with FIG. 3. To accomplish this, in the frame 14, which is supported outside of the conveyor system 4 and may already be preassembled into a unit together with the long stroke unit 15 and the mounting tool 19, a lower cross strut 20 is removed from the frame 14 by undoing a screw fastening 21. The separated lower cross strut 20 is brought into position below the conveyor system 4, resting on non-illustrated support elements, and connected to the conveyor profile 6 by a tab 22 and a screw 23. The remaining frame with the premounted parts is now fitted over the conveyor system 4 with a non-illustrated hoisting tool and with the aid of a centering pin 24 that engages a recess 25 of the lower cross strut 20, it reaches the position shown in FIG. 3. The screw fastening 21 secures the assumed position. With a known dowel 26, the lower cross strut 20 and thus the frame 14 is anchored to a floor 28, with the interposition of a spacer plate 27. When the mounting system 1 is dismantled, the procedure is done in reverse.

Figure 4:
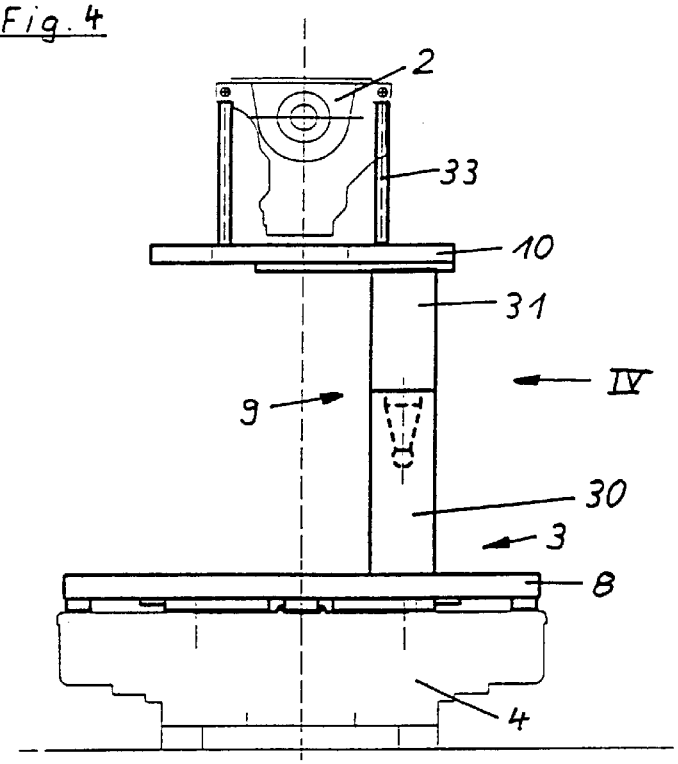
FIG. 4 is a partly broken away, front elevational view of the conveyor system with the workpiece carrier and a workpiece with a specified workpiece height.
Figure 5:
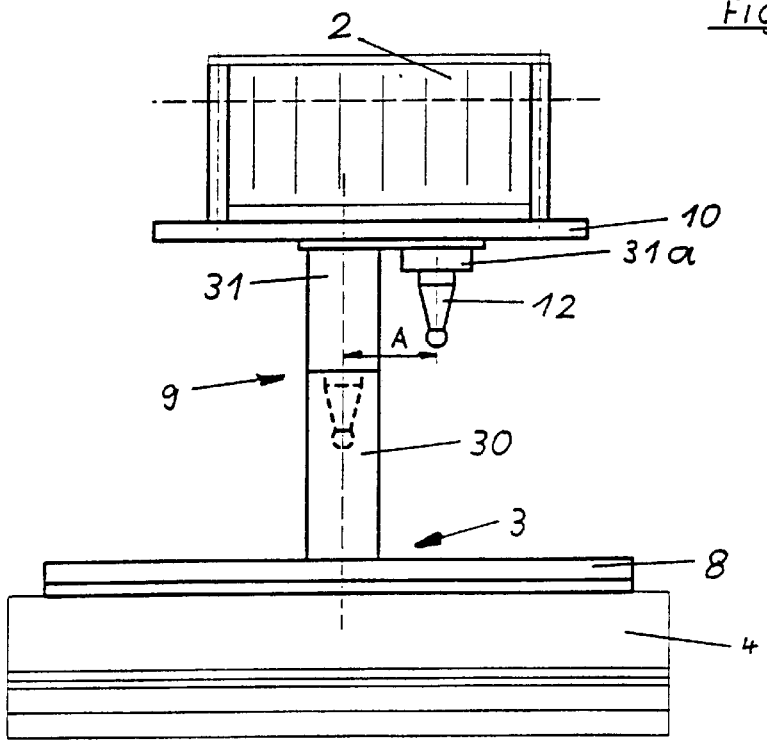
FIG. 5 is a side elevational of the workpiece carrier taken in a direction of arrow IV of FIG. 4.

FIGS. 4 and 5, illustrated without out the frame 14 and the long stroke unit 15, show the column 9 that is in two parts in its longitudinal extent. A lower column part 30 is connected to the base plate 8 of the workpiece carrier 3. Two upper column parts 31 and 31a, projecting vertically toward the base plate 8, and disposed parallel to one another by a predeterminable spacing are joined by the supporting element 10 that receives the components 2 on supports 33. The upper column parts 31, 31a project different lengths away from the supporting element 10. In terms of the conveying direction, they are disposed in series. The free ends of each upper column part 31, 31a are embodied as the pins 12, which engage a corresponding recess in the lower column part 30 for the sake of positioning.

Figure 6:
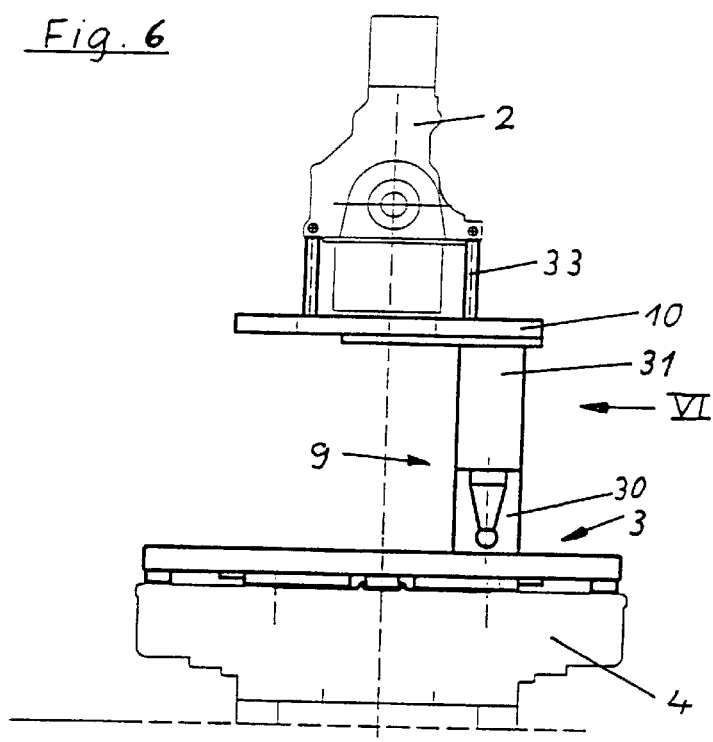
FIG. 6 is a front elevational view of a reduced working height of the workpiece carrier.
Figure 7:
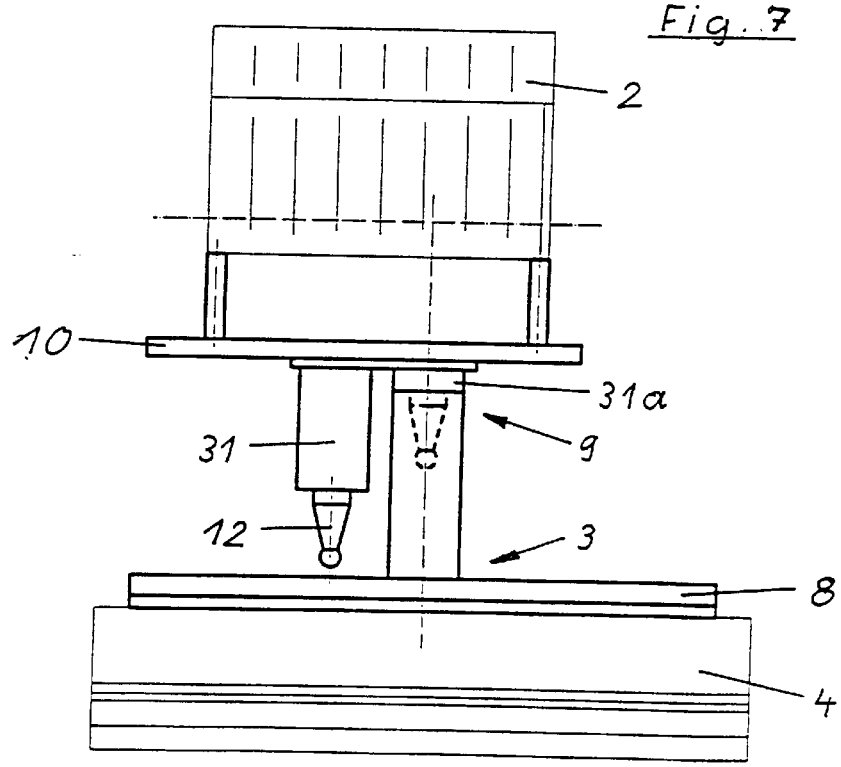
FIG. 7 is a side elevational view of a second position of the workpiece carrier taken in a direction of arrow VI of FIG. 6.

If, because of a different type of component 2, a reduced working height is needed as shown in FIGS. 6 and 7, then the length of the column 9 is reduced accordingly by raising the supporting element 10 and horizontally displaying it in the conveying direction by a spacing dimension "A" and lowering the upper column part 31a. The height now attained can be seen in FIGS. 5 and 6.

Another exemplary embodiment will be explained in conjunction with FIG. 8. There, the column 9 includes a lower column part 30a associated with the base plate 8 and an upper column part 31b connected to the supporting element 10. The lower column part 30a is assigned a cone wheel gear 34, which is screwed to the base plate 8. Extending co-axially with the sleeve-like lower column part 30a is a spindle 32, which leads away from the cone wheel gear 34 and whose end remote from the cone wheel gear 34 engages a spindle nut 35 associated with the upper column part 31b. To adjust the height of the workpiece carrier 3, the spindle 32 is rotated via a crank pin 36, so that adaptation of the workpiece height can be done between the retracted position of the upper column part 31b in FIG. 9 and the extended position in FIG. 8. Once the gear is at a stop, the workpiece carrier 3 remains at the height selected, for instance by self-locking between the spindle 32 and the spindle nut 35. A device 37 for securing against relative rotation prevents relative rotation of the lower and upper column parts. A hand wheel or an electric motor can engage the crank pin 36. Between the upper column part 31b and the lower column part 30a, a guide 38 is provided, which facilitates a telescoping motion of the upper column part 31b relative to the lower column part 30a.

In a further exemplary embodiment the spindle can be dispensed with. Once the supporting element 10 is raised with a lever tool, a spacer is inserted between the upper column part and the lower column part, and the upper column part is set down on the spacer.

With spacers of a few different thicknesses, different workpiece height adaptations can easily be accomplished.

I claim:
1. A mounting system, comprising:
a conveyor system;
a workpiece carrier including:
    a base plate resting on said conveyor system;
    at least one column extending vertically away from said base plate; and
    a supporting element releasably connected to said at least one column for receiving components; and
a plurality of mounting stations for receiving the components transported on said workpiece carrier, each of said plurality of mounting stations including:
    a frame;
    a long stroke unit disposed laterally of said conveyor system and secured to said frame; and
    a supporting bracket projecting in a cantilevered fashion from said long stroke unit for engaging from beneath said supporting element of said workpiece carrier, said long stroke unit with said supporting bracket lifting and bringing the components in position to a respective mounting station.

2. The mounting system according to claim 1, wherein said base plate has symmetrical halves and said at least one column is disposed on one of said symmetrical halves remote from said long stroke unit.

3. The mounting system according to claim 1, wherein said at least one column and said supporting element are configured to form a separable plug-type connection.

4. The mounting system according to claim 1, wherein said supporting bracket has two parallel-extending forks.

5. The mounting system according to claim 1, wherein said frame has a cross strut formed with a recess therein and a sub-frame with a centering pin, said conveyor system has a conveyor belt profile and a tab, said cross strut is separated from said sub-frame and joined to said conveyor belt profile via said tab, said centering pin is then locked into said recess of said cross strut, and said sub-frame is screwed to said cross strut.

6. The mounting system according to claim 1, wherein said at least one column has a lower column portion and at least two upper column portions of different lengths, said lower column portion is disposed on said base plate and said at least two upper column portions of different lengths projecting in cantilevered fashion from said supporting element, and said lower column portion is selectively connected to one of said at least two upper column portions.

7. The mounting system according to claim 6, including positioning elements associated with at least one of said at least two upper column portions and said lower column portion.

8. The mounting system according to claim 7, wherein at least one of said lower column portion and said at least two upper column portions have bores formed therein and said positioning elements are pins to be inserted into said bores.

9. The mounting system according to claim 1, wherein said supporting bracket is retractably connected to said long stroke unit for retracting a predetermined extent.

* * * * *